US012659180B2

(12) United States Patent
Feng

(10) Patent No.: US 12,659,180 B2
(45) Date of Patent: Jun. 16, 2026

(54) METHODS AND APPARATUSES FOR REGISTERING AND EXECUTING SMART CONTRACT IN BLOCKCHAIN

(71) Applicant: Digital Currency Institute, The People's Bank of China, Beijing (CN)

(72) Inventor: Kaikai Feng, Beijing (CN)

(73) Assignee: DIGITAL CURRENCY INSTITUTE, THE PEOPLE'S BANK OF CHINA, Beijing (CN)

( * ) Notice: Subject to any disclaimer, the term of this patent is extended or adjusted under 35 U.S.C. 154(b) by 209 days.

(21) Appl. No.: 18/276,872

(22) PCT Filed: Feb. 10, 2022

(86) PCT No.: PCT/CN2022/075942
§ 371 (c)(1),
(2) Date: Aug. 10, 2023

(87) PCT Pub. No.: WO2022/171187
PCT Pub. Date: Aug. 18, 2022

(65) Prior Publication Data
US 2024/0121120 A1 Apr. 11, 2024

(30) Foreign Application Priority Data
Feb. 10, 2021 (CN) .......................... 202110185551.X

(51) Int. Cl.
*H04L 29/06* (2006.01)
*H04L 9/00* (2022.01)
(52) U.S. Cl.
CPC ...................................... *H04L 9/50* (2022.05)
(58) Field of Classification Search
CPC ......... H04L 9/50; H04L 63/12; H04L 67/104; H04L 67/10; H04L 67/1097; G06F 21/64;
(Continued)

(56) References Cited

U.S. PATENT DOCUMENTS

| | | | | |
|---|---|---|---|---|
| 11,393,024 B1* | 7/2022 | Kodihalli | ............... | G06N 20/00 |
| 11,544,782 B2* | 1/2023 | Cella | ....................... | G06Q 40/03 |

(Continued)

FOREIGN PATENT DOCUMENTS

| | | |
|---|---|---|
| CN | 108073513 A | 5/2018 |
| CN | 108510251 A | 9/2018 |

(Continued)

OTHER PUBLICATIONS

The search report of counterpart EP application No. 22752347.9 issued on Jan. 17, 2025.

*Primary Examiner* — Shin-Hon (Eric) Chen
*Assistant Examiner* — Vladimir I Gavrilenko
(74) *Attorney, Agent, or Firm* — The Sun IP Law

(57) ABSTRACT

The present disclosure relates to the technical field of computers. Provided are methods and apparatuses for registering and executing a smart contract in a blockchain. An example implementation mode of the method includes: a first smart contract deployed on a blockchain is determined, wherein the first smart contract includes an event trigger function; identification information of the first smart contract and an event corresponding to the event trigger function are registered to a bottom layer of the blockchain by means of a preset bottom layer interface; and a corresponding monitoring interface is generated for the event, and event information related to the event is obtained by means of the monitoring interface, so as to execute the first smart contract based on the event information related to the event.

12 Claims, 4 Drawing Sheets

(58) Field of Classification Search
    CPC .... G06Q 2220/00; G06Q 30/06; G06Q 40/02;
                                           G06Q 40/04
    See application file for complete search history.

(56)                     References Cited

U.S. PATENT DOCUMENTS

| 2020/0044857 A1* | 2/2020 | Snow ................... G06Q 20/367 |
| 2021/0019849 A1* | 1/2021 | Qian ....................... G06F 9/547 |
| 2021/0184845 A1* | 6/2021 | Hébert .................. H04L 9/3218 |
| 2022/0278857 A1* | 9/2022 | Wakabayashi ....... G06Q 20/127 |
| 2022/0292082 A1* | 9/2022 | Qiu ..................... G06F 9/45558 |

FOREIGN PATENT DOCUMENTS

| CN | 109670950 A | 4/2019 |
| CN | 110264190 A | 9/2019 |
| CN | 111857892 A | 10/2020 |
| CN | 112837155 A | 5/2021 |
| EP | 3594867 A1 | 1/2020 |
| WO | 2020224250 A1 | 11/2020 |
| WO | 2020233622 A1 | 11/2020 |

* cited by examiner

Fig. 3

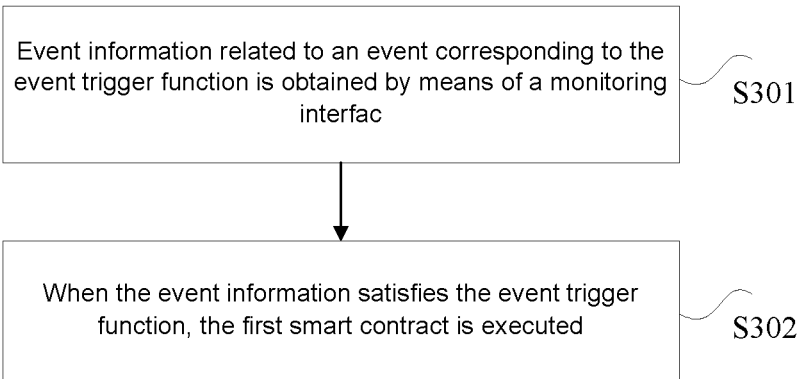

Event information related to an event corresponding to the event trigger function is obtained by means of a monitoring interfac — S301

When the event information satisfies the event trigger function, the first smart contract is executed — S302

Fig. 4

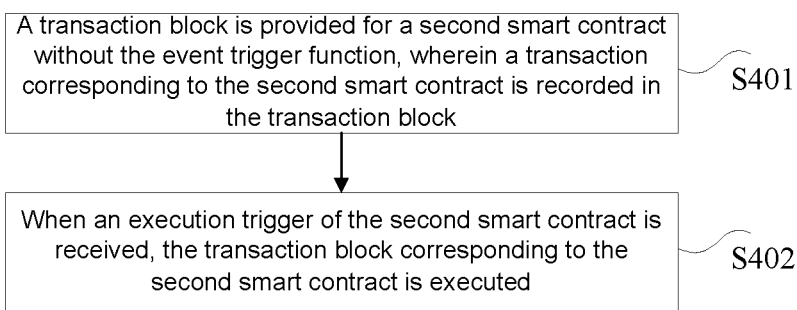

A transaction block is provided for a second smart contract without the event trigger function, wherein a transaction corresponding to the second smart contract is recorded in the transaction block — S401

When an execution trigger of the second smart contract is received, the transaction block corresponding to the second smart contract is executed — S402

Fig. 5

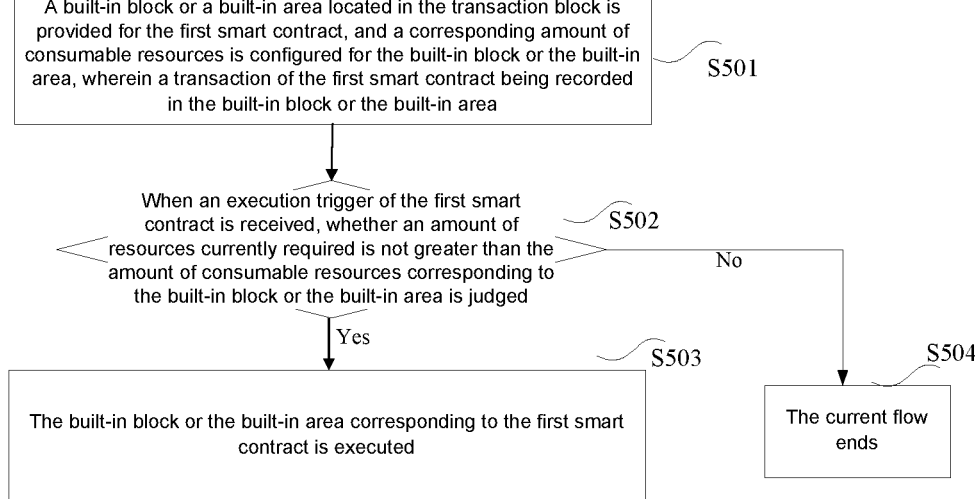

A built-in block or a built-in area located in the transaction block is provided for the first smart contract, and a corresponding amount of consumable resources is configured for the built-in block or the built-in area, wherein a transaction of the first smart contract being recorded in the built-in block or the built-in area — S501

When an execution trigger of the first smart contract is received, whether an amount of resources currently required is not greater than the amount of consumable resources corresponding to the built-in block or the built-in area is judged — S502

No

Yes

The built-in block or the built-in area corresponding to the first smart contract is executed — S503

The current flow ends — S504

900

| CPU | 901 | ROM | 902 | RAM | 903 |

904

I/O interface — 905

| Input part | Output part | Storage part | Communication part | Driver | 910 |

906    907    908    909

Removable medium — 911

METHODS AND APPARATUSES FOR REGISTERING AND EXECUTING SMART CONTRACT IN BLOCKCHAIN

CROSS-REFERENCE TO RELATED APPLICATION

The present disclosure claims priority of Chinese patent application No. 202110185551.X filed on Feb. 10, 2021 and entitled "Methods and Apparatuses for Registering and Executing Smart Contract in Blockchain", the disclosure of which is hereby incorporated by reference in its entirety or in part.

TECHNICAL FIELD

The present disclosure relates to the field of blockchains, and in particular to methods and apparatuses for registering and executing a smart contract in a blockchain.

BACKGROUND

A blockchain may be thought of as a decentralized and trusted distributed ledger. Since the blockchain consists of many nodes to form an end-to-end network, there is no centralized apparatus and management mechanism, and data is distributedly stored and recorded in the blockchain, so that the blockchain is tamper-resistant. Therefore, digitally writing a smart contract into the blockchain and completing a corresponding transaction by executing the smart contract in the blockchain have been increasingly favored by various institutions.

At present, the smart contract existing in the blockchain typically requires an external transaction to trigger execution. For some transactions that need to be triggered by means of a specific event, such as timed transactions (smart contracts realizing fixed-time reconciliation between financial institutions), transactions executed according to generated service records (when a certain service record appears, a corresponding smart contract is executed), etc., it is still an urgent problem to be solved by existing smart contract management and execution modes.

Summary

In view of this, embodiments of the present disclosure provide methods and apparatuses for registering and executing a smart contract in a blockchain, by which monitoring may be performed by registering an event corresponding to an event trigger function included in the smart contract, so as to execute a first smart contract according to a monitored result (namely, event information related to the event), thereby triggering the execution of the smart contract by means of a specific event.

In order to achieve the above objective, according to an aspect of the embodiments of the present disclosure, a method for registering a smart contract in a blockchain is provided, including:

determining a first smart contract deployed on the blockchain, wherein the first smart contract includes an event trigger function;

registering identification information of the first smart contract and an event corresponding to the event trigger function to a bottom layer of the blockchain by means of a preset bottom layer interface; and generating a corresponding monitoring interface for the event, and obtaining event information related to the event by means of the monitoring interface, so as to execute the first smart contract based on the event information related to the event.

As at least one alternative embodiment, the first smart contract further includes a contract information table, wherein the identification information of the smart contract and the event corresponding to the event trigger function are collated in the contract information table;

before registering the identification information of the first smart contract and the event corresponding to the event trigger function to the bottom layer of the blockchain, the method further includes:

obtaining the identification information of the first smart contract and the event corresponding to the event trigger function in the contract information table by means of the bottom layer interface.

As at least one alternative embodiment, the method for registering the smart contract in the blockchain further includes that: maintaining a correspondence between a type of an event trigger function and an event;

before registering the identification information of the first smart contract and the event corresponding to the event trigger function to the bottom layer of the blockchain, the method further includes:

obtaining the identification information of the first smart contract and the event trigger function from the first smart contract by means of the bottom layer interface; and determining the event corresponding to the event trigger function based on the correspondence.

As at least one alternative embodiment, the method for registering the smart contract in the blockchain further includes that: generating a corresponding transaction block for a second smart contract, and recording a transaction corresponding to the second smart contract in the transaction block, wherein the second smart contract is a smart contract without an event trigger function, so that the second smart contract is executed based on the transaction block; and generating a corresponding built-in block or a built-in area located in a transaction block for the first smart contract, configuring a corresponding amount of consumable resources for the built-in block or the built-in area located in the transaction block, and recording a transaction corresponding to the first smart contract in the built-in block or the built-in area, so that the first smart contract is executed based on the built-in block or the built-in area located in the transaction block.

As at least one alternative embodiment, registering the identification information of the first smart contract and the event corresponding to the event trigger function to the bottom layer of the blockchain includes:

when the first smart contract includes at least two event trigger functions, and each of the event trigger functions corresponds to one processing logic in the first smart contract, registering the identification information of the first smart contract, events corresponding to the at least two event trigger functions and identification information of processing logics corresponding to the events to the bottom layer of the blockchain by means of the preset bottom layer interface.

As at least one alternative embodiment, the method for registering the smart contract in the blockchain further includes:

monitoring an update condition of the first smart contract; and when the update condition indicates that the event trigger function is updated, updating the event corresponding to the event trigger function.

As at least one alternative embodiment, the event includes any one or more of a time trigger event, a block height trigger event, and a service record trigger event.

In a second aspect, the embodiments of the present disclosure provide a method for executing a smart contract in a blockchain, which includes:

for a first smart contract including an event trigger function, executing:

obtaining event information related to an event corresponding to the event trigger function by means of a monitoring interface; and when the event information satisfies the event trigger function, executing the first smart contract.

As at least one alternative embodiment, the method for executing the smart contract in the blockchain further includes:

providing a transaction block for a second smart contract without an event trigger function, wherein a transaction corresponding to the second smart contract is recorded in the transaction block; and when an execution trigger of the second smart contract is received, executing the transaction block corresponding to the second smart contract.

As at least one alternative embodiment, the method for executing the smart contract in the blockchain further includes that: providing a built-in block or a built-in area located in a transaction block for the first smart contract, and configuring a corresponding amount of consumable resources for the built-in block or the built-in area, wherein a transaction of the first smart contract is recorded in the built-in block or the built-in area;

executing the first smart contract includes:

when an execution trigger of the first smart contract is received, judging whether an amount of resources currently required is not greater than the amount of consumable resources corresponding to the built-in block or the built-in area, if so, executing the built-in block or the built-in area corresponding to the first smart contract, otherwise prohibiting the execution.

As at least one alternative embodiment, executing the first smart contract includes:

when the first smart contract includes at least two event trigger functions, and each of the event trigger functions corresponds to one processing logic in the first smart contract, executing the processing logic corresponding to the event trigger function according to the event information.

In a third aspect, the embodiments of the present disclosure provide an apparatus for registering a smart contract in a blockchain, which includes: a determination unit, a registration unit, and a first monitoring unit, wherein, the determination unit is configured to determine a first smart contract deployed on the blockchain, wherein the first smart contract includes an event trigger function;

the registration unit is configured to register identification information of the first smart contract and an event corresponding to the event trigger function to a bottom layer of the blockchain by means of a preset bottom layer interface; and the first monitoring unit is configured to generate a corresponding monitoring interface for the event, and obtain event information related to the event by means of the monitoring interface, so as to execute the first smart contract based on the event information related to the event.

In a fourth aspect, the embodiments of the present disclosure provide an apparatus for executing a smart contract in a blockchain, which includes: a second monitoring unit and an execution unit, wherein, the second monitoring unit is configured to execute, for a first smart contract including an event trigger function, an operation of obtaining event information related to an event corresponding to the event trigger function by means of a monitoring interface; and the execution unit is configured to execute the first smart contract when the event information satisfies the event trigger function.

One embodiment of the present disclosure has the following advantages or beneficial effects that: the identification information of the first smart contract and the event corresponding to the event trigger function are registered to the bottom layer of the blockchain by means of the preset bottom layer interface, and the corresponding monitoring interface is generated for the event, that is, the smart contract is registered to the bottom layer of the blockchain, so that the event corresponding to the event trigger function included in the smart contract may be monitored by means of registration, so as to execute the first smart contract according to a monitored result (namely, the event information related to the event), thereby triggering the execution of the smart contract by means of a specific event.

Further effects of the above non-conventional alternatives are described below in conjunction with the specific implementation modes.

BRIEF DESCRIPTION OF THE DRAWINGS

The accompanying drawings are used for a better understanding of the present disclosure, and do not constitute improper limitations to the present disclosure. Herein:

FIG. 3 is a schematic diagram of a main flow of a method for executing a smart contract in a blockchain according to an embodiment of the present disclosure.

FIG. 4 is a schematic diagram of a main flow of a method for executing a smart contract in a blockchain according to another embodiment of the present disclosure.

FIG. 5 is a schematic diagram of a main flow of a method for executing a smart contract in a blockchain according to yet another embodiment of the present disclosure.

DETAILED DESCRIPTION OF THE EMBODIMENTS

Exemplary embodiments of the present disclosure are described in detail below with reference to the drawings, including various details of the embodiments of the present disclosure to facilitate understanding, and should be regarded as merely exemplary. Thus, those of ordinary skill in the art shall understand that, variations and modifications can be made on the embodiments described herein, without departing from the scope and spirit of the present disclosure. Likewise, for clarity and conciseness, descriptions of well-known functions and structures are omitted in the following description.

A smart contract is a set of commitments or obligations defined in a programming language, on which contract participants execute an agreement of these commitments or obligations. The agreement includes execution logics with a logic sequence.

Figure 1:
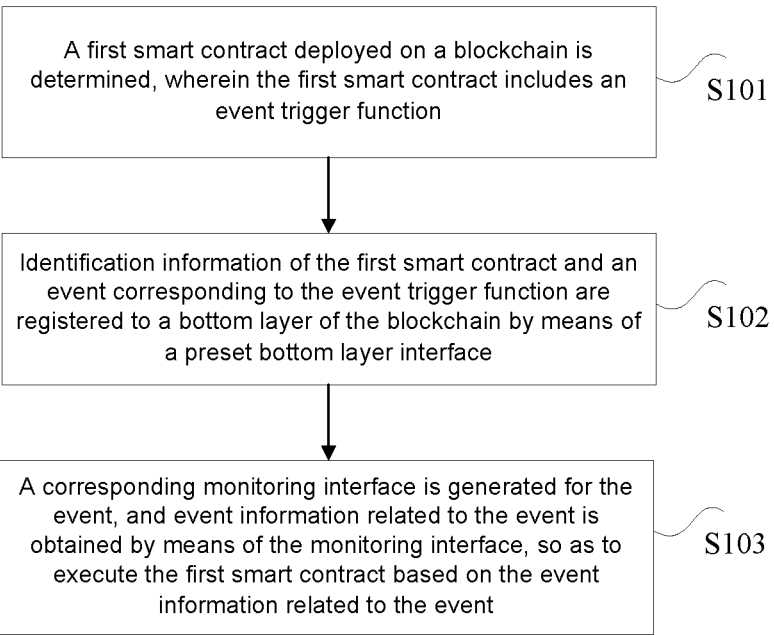
FIG. 1 is a schematic diagram of a main flow of a method for registering a smart contract in a blockchain according to an embodiment of the present disclosure.

FIG. 1 is a schematic diagram of a method for registering a smart contract in a blockchain according to an embodiment of the present disclosure. As shown in FIG. 1, the method for registering the smart contract in the blockchain may include the following steps.

At S101, a first smart contract deployed on a blockchain is determined. The first smart contract includes an event trigger function.

At S102, identification information of the first smart contract and an event corresponding to the event trigger function are registered to a bottom layer of the blockchain by means of a preset bottom layer interface.

At S103, a corresponding monitoring interface is generated for the event, and event information related to the event is obtained by means of the monitoring interface, so as to execute the first smart contract based on the event information related to the event.

The event trigger function is a judgment function or a condition function. An event feature included in the event information (for example, a certain service execution completion identification, a block height of the blockchain, a block height increment of the blockchain, a current time, etc.) is input into the event trigger function, so as to determine whether the event feature satisfies the event trigger function, and if so, the smart contract corresponding to the event trigger function is triggered to be executed or logic execution in the smart contract corresponding to the event trigger function is triggered.

The event corresponding to the event trigger function may be a predefined event, which is matched with the event trigger function and capable of instructing the monitoring interface to obtain information recognizable by the event trigger function. By means of providing corresponding event identification or event feature information for the event, different events may be identified, and the event information related to the event may be obtained for the different events. For example, for a timed trigger function, an event corresponding thereto is a time trigger event, for example, an event which timing triggers the execution of the smart contract (the event information corresponding to the time trigger event may be a system time, and may also be a time counted according to the block height). For a block height trigger function, an event corresponding thereto is a block height trigger event (the event information corresponding to the block height trigger event may be a current block height of the blockchain, and may also be a block height increment of the blockchain). For a service record trigger function, an event corresponding thereto is a service record trigger event (the event information corresponding to a specific service execution completion trigger event may be a feature identification for specific service execution completion).

The bottom layer interface is a channel for registering the identification information of the smart contract and the event corresponding to the event trigger function to the bottom layer of the blockchain, and the bottom layer interface may provide an interface information specification as to ensure the security of the blockchain, for example, only allowing the identification information of the smart contract and the event corresponding to the event trigger function, and not allowing information to be read by means of the bottom layer interface, etc.

In the embodiment shown in FIG. 1, the identification information of the first smart contract and the event corresponding to the event trigger function are registered to the bottom layer of the blockchain by means of the preset bottom layer interface, and the corresponding monitoring interface is generated for the event, that is, the smart contract is registered to the bottom layer of the blockchain, so that the event corresponding to the event trigger function included in the smart contract may be monitored, so as to execute the first smart contract according to a monitored result (namely, the event information related to the event), thereby triggering the execution of the smart contract by means of a specific event.

The execution of the first smart contract requires native support from the bottom layer of the chain (that is, the identification information of the first smart contract and the event corresponding to the event trigger function are registered to the bottom layer of the blockchain, and the corresponding monitoring interface is generated for the event), which relies more on the trust basis of the whole chain. Based on this, in the solutions provided by the embodiments of the present disclosure, the blockchain may be a consortium blockchain.

In the embodiments of the present disclosure, the event includes any one or more of a time trigger event, a block height trigger event, and a service record trigger event. Information related to a single event or information related to a combined event is obtained, so as to meet the requirements of smart contracts with different event trigger functions. For example, smart contracts corresponding to reconciliation services between financial institutions, and more smart contracts are uplinked, so as to strengthen the security management of more smart contracts.

In the embodiments of the present disclosure, the identification information of the first smart contract and the event corresponding to the event trigger function included in the first smart contract may have two sources and obtaining manners.

The first source and obtaining manner of the identification information and the event of the first smart contract is as follows.

The first smart contract further includes a contract information table. The identification information of the smart contract and the event corresponding to the event trigger function are collated in the contract information table. Accordingly, before registering the identification information of the first smart contract and the event corresponding to the event trigger function to the bottom layer of the blockchain, the method may further include that: the identification information of the first smart contract and the event corresponding to the event trigger function in the contract information table are obtained by means of the bottom layer interface. By means of the above process, the registration may be completed according to the information provided by the smart contract, so as to ensure the accuracy of the registration information.

The structure of the contract information table may be as shown in Tables 1 and 2. Table 1 shows a case where one smart contract corresponds to one event trigger function, and Table 2 shows a case where a plurality of logics in one smart contract respectively have corresponding event trigger functions.

TABLE 1

| Identification information of smart contract | Event corresponding to event trigger function |
|---|---|
| A | Event 1 |

TABLE 2

| Identification information of smart contract | Identification information of logic | Event corresponding to event trigger function |
|---|---|---|
| A | A1 | Event 1 |
| | A2 | Event 1 |
| | A4 | Event 3 |
| | A6 | Event 2 |
| | . . . | . . . |

The second source and obtaining manner of the identification information and the event of the first smart contract is as follows.

The method for registering the smart contract in the blockchain further includes that: a correspondence between a type of an event trigger function and an event is maintained. Accordingly, before registering the identification information of the first smart contract and the event corresponding to the event trigger function to the bottom layer of the blockchain, the method may further include that: the identification information of the first smart contract and the event trigger function are obtained from the first smart contract by means of the bottom layer interface; and the event corresponding to the event trigger function is determined based on the correspondence.

The correspondence between the type of the event trigger function and the event may be as shown in Table 3 below.

TABLE 3

| Type of event trigger function | Event | Event feature identification |
|---|---|---|
| Type 1 | Time trigger event | SJ |
| Type 2 | Block height trigger event | KG |
| Type 3 | Service record trigger event | JL |

The type of the event trigger function is mainly determined according to the structure, an independent variable, etc. of the event trigger function. For example, the event trigger function of which the independent variable is time is of type 1, the event trigger function of which the independent variable is information related to the block height, such as the block height and the block height increment, is of type 2, and the event trigger function of which the independent variable is information related to a service record, such as the service feature identification, is of type 3.

In the process of registering the first smart contract, the type of the event trigger function of the first smart contract is determined, and a corresponding event is matched for the event trigger function according to the type of the event trigger function of the first smart contract by means of looking up Table 2, so as to correspondingly register the event and identification information of the first smart contract to the bottom layer of the blockchain.

By means of the above second source and obtaining manner of the identification information and the event of the first smart contract, the unified maintenance of the type of the event trigger function, the event, and the event feature identification is realized, without the need for a contractor of the smart contract to maintain the event corresponding to the event trigger function of the smart contract, so as to ensure the standardization and unification of the event registered on the whole blockchain.

The existence of the two sources and obtaining manners of the identification information and the event of the first smart contract enables the registration process to have a certain flexibility and selectivity, so as to satisfy different user needs, better serve users and improve user experience.

Figure 2:
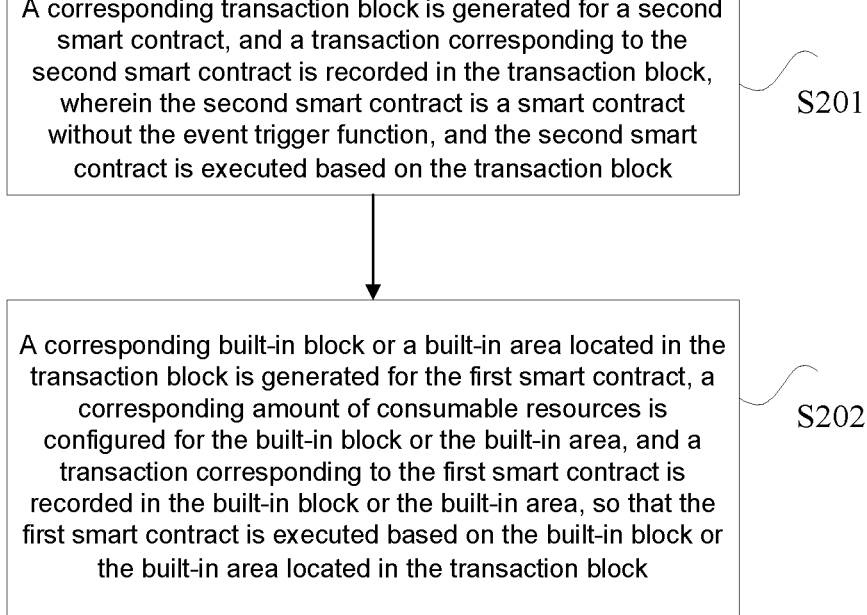
FIG. 2 is a schematic diagram of a main flow of a method for registering a smart contract in a blockchain according to another embodiment of the present disclosure.

In the embodiments of the present disclosures, differential management of the smart contract with the event trigger function and the smart contract without the event trigger function is implemented. As shown in FIG. 2, the method for registering the smart contract in the blockchain may further include the following steps.

At S201, a corresponding transaction block is generated for a second smart contract, and a transaction corresponding to the second smart contract is recorded in the transaction block. The second smart contract is a smart contract without the event trigger function, so that the second smart contract is executed based on the transaction block.

At S202, a corresponding built-in block or a built-in area located in a transaction block is generated for the first smart contract, a corresponding amount of consumable resources is configured for the built-in block or the built-in area, and a transaction corresponding to the first smart contract is recorded in the built-in block or the built-in area, so that the first smart contract is executed based on the built-in block or the built-in area located in the transaction block.

Understandably, there is no strict sequence between S201 and S202 when the built-in block is generated for the first smart contract. When the built-in area located in the transaction block is generated for the first smart contract, at least one transaction block needs to be present first.

The corresponding amount of consumable resources is configured for the built-in block or built-in area, so that the execution of the first smart contract may be forced to stop when the amount of resources is not lower than the amount of consumable resources, thereby avoiding the problems of downtime caused by an infinite loop, etc.

In addition, the corresponding transaction block may also be generated for the first smart contract, the built-in area is divided in the transaction block, and the corresponding amount of consumable resources is configured for the built-in area. The transaction block corresponding to the first smart contract is configured to record the transaction record of the first smart contract. Before executing the first smart contract, whether the current amount of resources is less than the amount of consumable resources corresponding to the built-in area may be judged first. If so, the first smart contract is executed, and the transaction of the first smart contract is recorded in an area outside the built-in area in a transaction block, so that a recording area of the transaction record is separated from the built-in area, and management of the transaction record is facilitated.

In the embodiments of the present disclosure, the method for registering the smart contract in the blockchain may further include that: an update condition of the first smart contract is monitored; and when the update condition indicates that the event trigger function is updated, the event corresponding to the event trigger function is updated. By means of the above process, the event corresponding to the event trigger function is updated, so as to ensure the accuracy of execution of the smart contract.

In the embodiments of the present disclosure, registering the identification information of the first smart contract and the event corresponding to the event trigger function to the bottom layer of the blockchain may include that: when the first smart contract includes at least two event trigger functions, and each of the event trigger functions corresponds to one processing logic in the first smart contract, the identification information of the first smart contract, the events corresponding to the at least two event trigger functions and the identification information of the processing logics corresponding to the events are registered to the bottom layer of the blockchain by means of the preset bottom layer interface. For example, the processing logic 1 included in the first smart contract corresponds to the event trigger function 1, the processing logic 2 corresponds to the event trigger function 2, the processing logic 3 corresponds to the event trigger function 3, the processing logic 4 corresponds to the event trigger function 4, and the processing logic 5 corresponds to the event trigger function 5, etc. The event trigger function 1 and the event trigger function 2 correspond to the event 1, the event trigger function 3 and the event 4 correspond to the event 2, and the event trigger function 5 corresponds to the event 3. The feature identifications corresponding to the processing logic 1 to the processing logic 5 are respectively A1, A2, A3, A4 and A5, and a registration result may be as shown in Table 4.

TABLE 4

| Identification information of smart contract | Feature identification of processing logic | Event corresponding to event trigger function |
|---|---|---|
| A | A1, A2 | Event 1 |
| | A3, A4 | Event 2 |
| | A5 | Event 3 |

FIG. 3 is a method for executing a smart contract in a blockchain according to an embodiment of the present disclosure. As shown in FIG. 3, the method for executing the smart contract in the blockchain may include the following steps.

For a first smart contract including an event trigger function, the following operations are executed.

At S301, event information related to an event corresponding to the event trigger function is obtained by means of a monitoring interface.

At S302, when the event information satisfies the event trigger function, the first smart contract is executed.

For a service record trigger function, the event information corresponding thereto includes a service identification which has been executed, and accordingly, the event information satisfying the service record trigger function means that the service identification which has been executed is matched with the service identification included in the service record trigger function, or the service identification which has been executed belongs to one of the service identifications included in the service record trigger function.

For a time trigger function, the event information corresponding thereto includes an obtained current time, and accordingly, the event information satisfying the time trigger function means that, after adding the current time to the time trigger function, a limiting condition corresponding to the time trigger function may be satisfied, for example, the time trigger function is: $0.9 \ h \leq T_n - T_{n-1} \leq 1.15 \ h$, where $T_n$ represents the current time, and $T_{n-1}$ represents the execution time of the last execution of the first smart contract; 0.9 h represents 0.9 hour, 1 h represents 1 hour, and greater than or equal to 0.9 h and less than or equal to 1.15 h is a limiting condition corresponding to the time trigger function. Assuming that the execution time of the last execution of the smart contract is 2020.5.20/10:00, and the current time is 2020.5.20/10:30, the current time does not satisfy the time trigger function $0.9 \ h \leq T_n - T_{n-1} \leq 1.15 \ h$. Assuming that the execution time of the last execution of the smart contract is 2020.5.20/10:00 and the current time is 2020.5.20/11:00, the current time satisfies the time trigger function $0.9 \ h \leq T_n - T_{n-1} \leq 1.15 \ h$. The current time is also obtained by multiplying the recorded block height by an average time interval at which each block is generated.

For a block height trigger function, the event information corresponding thereto includes an obtained current block height or block height increment, and accordingly, the event information satisfying the block height trigger function means that, after adding the current block height or the block height increment to the block height trigger function, a limiting condition corresponding to the block height trigger function may be satisfied, for example, the block height trigger function is: $100 \leq G_n - G_{n-1} \leq 200$, where $G_n$ represents the current block height, $G_{n-1}$ represents the execution block height of the last execution of the first smart contract, 100 represents the block height of 100, 200 represents the block height of 200, and greater than or equal to 100 and less than or equal to 200 is a limiting condition corresponding to the block height trigger function. Assuming that the execution block height of the last execution of the first smart contract is 1000, and the current block height is 1050, the current block height does not satisfy the block height trigger function $100 G_n - G_{n-1} \leq 200$. Assuming that the execution block height of the last execution of the first smart contract is 1000, and the current block height is 1150, the current block height satisfies the block height trigger function $100 \leq G_n - G_{n-1} \leq 200$.

In the above embodiments, the event information related to the event corresponding to the event trigger function is obtained by means of the monitoring interface, and whether the event information satisfies the event trigger function is judged, so as to judge whether to execute the first smart contract with the event trigger function, so that the first smart contract is triggered in the blockchain by means of combining the event information and the event trigger function, thereby effectively ensuring that the first smart contract with the event trigger function in the blockchain can be executed according to the event information related to the event.

The execution of the first smart contract requires native support from the bottom layer of the chain (that is, the identification information of the first smart contract and the event corresponding to the event trigger function are registered to the bottom layer of the blockchain, and the corresponding monitoring interface is generated for the event), which relies more on the trust basis of the whole chain. Based on this, in the solutions provided by the embodiments of the present disclosure, the blockchain may be a consortium blockchain.

In the embodiments of the present disclosure, as shown in FIG. 4, the method for executing the smart contract in the blockchain may further include the following steps.

At S401, a transaction block is provided for a second smart contract without an event trigger function. A transaction corresponding to the second smart contract is recorded in the transaction block.

At S402, when an execution trigger of the second smart contract is received, the transaction block corresponding to the second smart contract is executed.

In the embodiments of the present disclosure, as shown in FIG. 5, the method for executing the smart contract in the blockchain may further include the following steps.

At S501, a built-in block or a built-in area located in the transaction block is provided for the first smart contract, and a corresponding amount of consumable resources is configured for the built-in block or the built-in area. A transaction of the first smart contract is recorded in the built-in block or the built-in area.

At S502, when an execution trigger of the first smart contract is received, whether an amount of resources currently required is not greater than the amount of consumable resources corresponding to the built-in block or the built-in area is determined, if so, S503 is executed, otherwise S504 is executed.

At S503, the built-in block or the built-in area corresponding to the first smart contract is executed, and the current flow ends.

At S504, the execution is prohibited.

The amount of consumable resources refers to an amount of resources that may be currently provided by a contracting party executing the first smart contract.

The amount of resources currently required refers to an amount of resources that the contracting party of the first smart contract needs to pay for the execution of the first smart contract.

For example, if the current smart contract is a smart contract without the event trigger function (the smart contract is executed by means of an external trigger outside the blockchain), the current smart contract is executed according to the embodiment given in FIG. 4. If the current smart contract is a smart contract with the event trigger function (the smart contract is triggered to execute by means of the event information corresponding to the event within the blockchain), the current smart contract is executed according to the embodiment given in FIG. 5.

By means of the embodiments of FIGS. 4 and 5, differentiated execution of the smart contract without event trigger function and the smart contract with the event trigger functions is implemented. The smart contract with the event trigger function is executed by means of the embodiment of FIG. 5, and the corresponding amount of consumable resources is configured for the built-in block or the built-in area, so that the execution of the smart contract with the event trigger function is forced to stop when the amount of resources is not lower than the amount of consumable resources, thereby avoiding the problems of downtime caused by an infinite loop, etc.

In the embodiments of the present disclosure, the step of executing the first smart contract may include that: when the first smart contract includes at least two event trigger functions, and each of the event trigger functions corresponds to one processing logic in the first smart contract, the processing logic corresponding to the event trigger function is executed according to the event information. For example, if the event information a satisfies the event trigger function 1 corresponding to the processing logic 1 in the first smart contract, the processing logic 1 in the first smart contract is executed. If the event information b satisfies the event trigger function 3 corresponding to the processing logic 3 in the first smart contract, the processing logic 3 in the first smart contract is executed, etc. By means of the above process, the logic in the smart contract is implemented in segments to satisfy the more complex and diverse requirements of the smart contract.

It is to be noted that, in each of the above embodiments, the event is a time trigger event, and accordingly, the event information includes a current time; the event is a block height trigger event, and accordingly, the event information includes a block height of the blockchain; and the event is a service record trigger event, and accordingly, the event information includes a service record or a service identification in the service record, etc.

Figure 6:
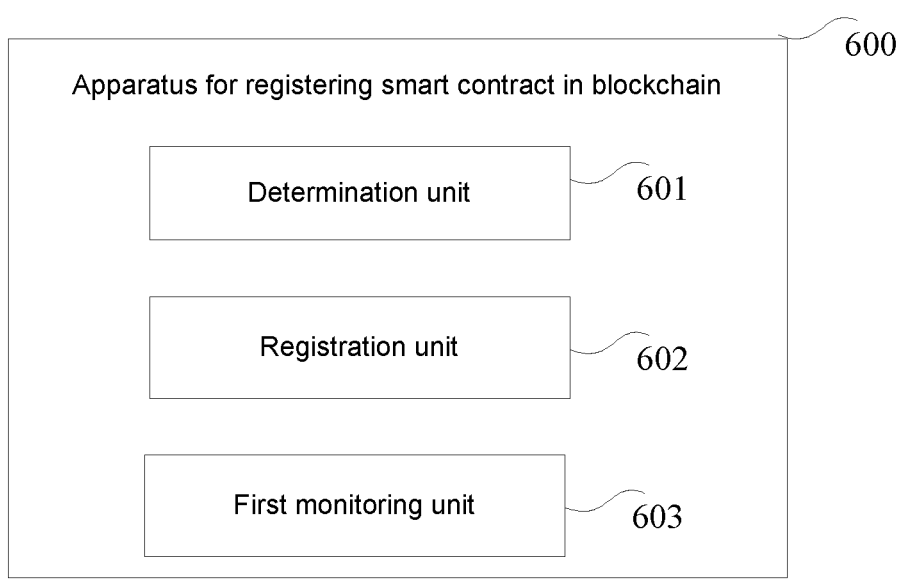
FIG. 6 is a schematic diagram of main units of an apparatus for registering a smart contract in a blockchain according to an embodiment of the present disclosure.

As shown in FIG. 6, the embodiments of the present disclosure provide a registration apparatus 600 of a smart contract in a blockchain. The registration apparatus 600 of the smart contract in the blockchain may include: a determination unit 601, a registration unit 602, and a first monitoring unit 603.

The determination unit 601 is configured to determine a first smart contract deployed on a blockchain. The first smart contract includes an event trigger function.

The registration unit 602 is configured to register identification information of the first smart contract and an event corresponding to the event trigger function to a bottom layer of the blockchain by means of a preset bottom layer interface.

The first monitoring unit 603 is configured to generate a corresponding monitoring interface for the event, and obtain event information related to the event by means of the monitoring interface, so as to execute the first smart contract based on the event information related to the event.

In the embodiments of the present disclosure, the first smart contract further includes a contract information table. The identification information of the smart contract and the event corresponding to the event trigger function are collated in the contract information table.

The registration unit 602 is further configured to obtain identification information of the first smart contract and the event corresponding to the event trigger function in the contract information table by means of the bottom layer interface.

In the embodiments of the present disclosure, the registration unit 602 is further configured to maintain a correspondence between a type of an event trigger function and an event; obtain the identification information and the event trigger function of the first smart contract from the first smart contract by means of the bottom layer interface; and determine the event corresponding to the event trigger function based on the correspondence.

In the embodiments of the present disclosure, the registration unit 602 is further configured to generate a corresponding transaction block for a second smart contract, and record a transaction corresponding to the second smart contract in the transaction block, where the second smart contract is a smart contract without the event trigger function, so that the second smart contract is executed based on the transaction block; and generate a corresponding built-in block or a built-in area located in a transaction block for the first smart contract, configure a corresponding amount of consumable resources for the built-in block or the built-in area located in the transaction block, and record a transaction corresponding to the first smart contract in the built-in block or the built-in area, so that the first smart contract is executed based on the built-in block or the built-in area located in the transaction block.

In the embodiments of the present disclosure, the registration unit 602 is further configured to register, when the first smart contract includes at least two event trigger functions, and each of the event trigger functions corresponds to one processing logic in the first smart contract, the identification information of the first smart contract, the events corresponding to the at least two event trigger functions and the identification information of the processing logics corresponding to the events to the bottom layer of the blockchain by means of the preset bottom layer interface.

In the embodiments of the present disclosure, the first monitoring unit 603 is further configured to monitor an update condition of the first smart contract; and update, when the update condition indicates that the event trigger function is updated, the event corresponding to the event trigger function.

Figure 7:
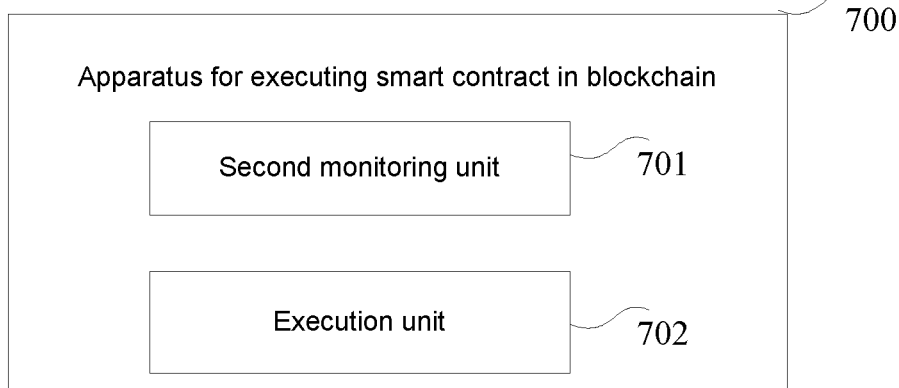
FIG. 7 is a schematic diagram of main units of an apparatus for executing a smart contract in a blockchain according to an embodiment of the present disclosure.

As shown in FIG. 7, the embodiments of the present disclosure provide an execution apparatus 700 for a smart contract in a blockchain. The execution apparatus 700 for the smart contract in the blockchain may include: a second monitoring unit 701 and an execution unit 702.

The second monitoring unit 701 is configured to execute, for a first smart contract including an event trigger function, an operation of obtaining event information related to an event corresponding to the event trigger function by means of a monitoring interface.

The execution unit 702 is configured to execute the first smart contract when the event information satisfies the event trigger function.

In the embodiments of the present disclosure, the execution unit 702 is further configured to provide a transaction block for a second smart contract without an event trigger function, wherein a transaction corresponding to the second smart contract is recorded in the transaction block; and execute, when an execution trigger of the second smart contract is received, the transaction block corresponding to the second smart contract.

In the embodiments of the present disclosure, the execution unit 702 is further configured to provide a built-in block or a built-in area located in the transaction block for the first smart contract, and configure a corresponding amount of consumable resources for the built-in block or the built-in area, wherein a transaction of the first smart contract is recorded in the built-in block or the built-in area; and judge, when an execution trigger of the first smart contract is received, whether an amount of resources currently required is not greater than the amount of consumable resources corresponding to the built-in block or the built-in area, if so, execute the built-in block or the built-in area corresponding to the first smart contract, otherwise prohibit the execution.

In the embodiments of the present disclosure, the execution unit 702 is further configured to execute, when the first smart contract includes at least two event trigger functions, and each of the event trigger functions corresponds to one processing logic in the first smart contract, the processing logic corresponding to the event trigger function according to the event information.

Figures 8, 9:
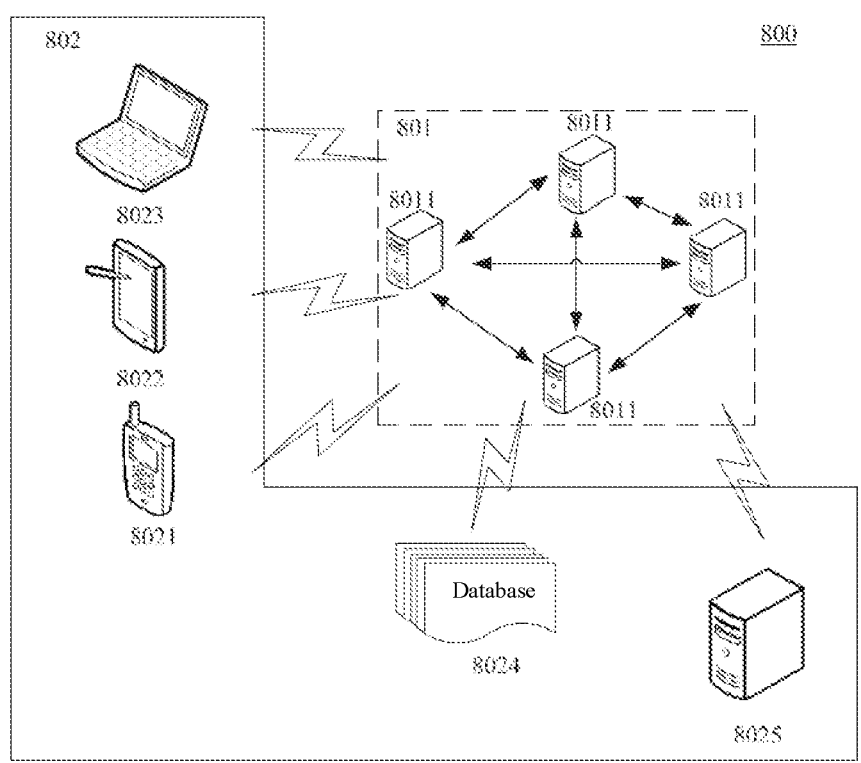
FIG. 8 is a diagram of an exemplary system architecture in which an embodiment of the present disclosure may be applied.
FIG. 9 is a schematic structural diagram of a computer system suitable for a server configured to implement an embodiment of the present disclosure.

FIG. 8 shows an exemplary system architecture 800 in which the method for registering the smart contract in the blockchain or the apparatus for registering the smart contract in the blockchain or the method for executing the smart contract in the blockchain or the apparatus for executing the smart contract in the blockchain of the embodiments of the present disclosure may be applied.

As shown in FIG. 8, the system architecture 800 may include a blockchain network 801 and an external device 802 of the blockchain network 801. The blockchain network

801 refers to a network configured to perform data sharing between nodes, and the blockchain network 801 may include a plurality of nodes 8011. Each node 8011 may receive input information from the external device 802 or information broadcast by other nodes during normal operation, and maintain shared data (namely, the blockchain) in the blockchain network based on the received input information. In order to ensure information intercommunication in the blockchain network 801, an information connection may exist between the nodes, and Peer To Peer (P2P) communication may be implemented between any two nodes, and in particular, the P2P communication may be performed via a wired communication link or a wireless communication link. For example, when any node in the blockchain network receives the input information, other nodes acquire the input information according to a consensus algorithm, and store the input information as data in shared data, so that the data stored on all nodes in the blockchain network are consistent. The external device 802 may include: terminal devices 8021, 8022 and 8023, a database 8024, a service server 8025, and an oracle machine 8026. The external device 802 may access the blockchain network 801 and may communicate with the node 8011 in the blockchain network 801.

A user interacts with the blockchain network 801 by using the terminal devices 8021, 8022 and 8023, the database 8024, the service server 8025, and the oracle machine 8026 to receive or send messages, etc.

The terminal devices 8021, 8022 and 8023 may be a variety of electronic devices having a display screen and supporting web browsing, including, but is not limited to, smartphones, tablets, laptops, desktops, and the like.

The node 8011 in the blockchain network 801 may be a server that provides various services, for example, a management server that provides support for transaction data submitted by the user using the terminal devices 8021, 8022 and 8023, for another example, a background management server that provides support for reconciliation data submitted by the service server 8025 or the database 8024, and for still another example, a management server that provides support for service data or reconciliation data submitted by the oracle machine 8026 or for the current time (only for illustration). The node 8011 in the blockchain network 801 may call the corresponding smart contract for the received service data or reconciliation data, etc. to perform analysis and other processing on the service data or the reconciliation data according to the smart contract.

It is to be noted that the method for registering the smart contract in the blockchain or the method for executing the smart contract in the blockchain provided by the embodiments of the present disclosure is generally executed by the node 8011 in the blockchain network 801, and accordingly, the apparatus for registering the smart contract in the blockchain or the apparatus for executing the smart contract in the blockchain is generally provided in the node 8011 in the blockchain network 801.

It is to be understood that the number of nodes, terminal devices, databases, service servers, and oracle machines in the blockchain network in FIG. 8 is merely illustrative. There may be any number of nodes, terminal devices, databases, service servers, and oracle machines in the blockchain network according to implementation requirements.

Referring to FIG. 9 below, which shows a schematic structural diagram of a computer system 900 suitable for a node in a blockchain network configured to implement an embodiment of the present disclosure. The nodes on the blockchain shown in FIG. 9 are merely an example and should not impose any restrictions on the functionality and scope of use of the embodiments of the present disclosure.

As shown in FIG. 9, the computer system 900 includes a Central Processing Unit (CPU) 901 that performs various suitable actions and processing according to programs stored in a Read Only Memory (ROM) 902 or loaded from a storage part 908 into a Random Access Memory (RAM) 903. Various programs and data required for the operation of the system 900 are also stored in the RAM 903. The CPU 901, the ROM 902, and the RAM 903 are connected to each other through a bus 904. An Input/Output (I/O) interface 905 is also connected to the bus 904.

The following components are connected to the I/O interface 905: an input part 906 including a keyboard, a mouse, etc.; an output part 907 including a Cathode Ray Tube (CRT), a Liquid Crystal Display (LCD), a speaker, etc.; a storage part 908 including a hard disk, etc.; and a communication part 909 including a network interface card such as a Local Area Network (LAN) card and a modem. The communication part 909 performs communication processing via a network such as Internet. A driver 910 is also connected to the I/O interface 905 as needed. A removable medium 911, such as a magnetic disk, an optical disk, a magneto-optical disk, or a semiconductor memory, is installed on the driver 910 as needed, so that a computer program read therefrom is installed into the storage part 908 as needed.

In particular, the process described above with reference to a flowchart may be implemented as a computer software program according to the embodiments of the present disclosure. For example, the embodiments of the present disclosure include a computer program product including a computer program carried on a computer-readable medium, the computer program including a program code for performing the method shown in the flowchart. In such an embodiment, the computer program may be downloaded and installed from the network via the communication part 909, and/or from the removable medium 911. The computer program is executed by the CPU 901 to perform the functions limited in the system of the present disclosure.

It is to be noted that the computer-readable medium shown in the present disclosure can be either a computer-readable signal medium or a computer-readable storage medium or any combination thereof. The computer-readable storage medium may be, but not limited to, for example, an electrical, magnetic, optical, electromagnetic, infrared, or semiconductor system, apparatus or device, or any combination thereof. More specific examples of the computer-readable storage medium may include an electrical connector with one or more wires, a portable disk, a hard disk, an RAM, an ROM, an Erasable Programmable ROM (EPROM or a flash memory), an optical fiber, a Compact Disc ROM (CD-ROM), an optical storage device, a magnetic storage device, or any proper combination thereof. In the present disclosure, the computer-readable storage medium may be any physical medium including or storing a program, and the program may be used by or in combination with an instruction execution system, apparatus or device. However, in the present disclosure, the computer-readable signal medium may include a data signal in a baseband or propagated as part of a carrier, a computer-readable program code being carried therein. A plurality of forms may be adopted for the propagated data signal, including, but not limited to, an electromagnetic signal, an optical signal, or any proper combination. The computer-readable signal medium may also be any readable medium except the computer-readable storage medium, and the computer-readable medium may send, propagate, or transmit a program configured to be used by or in combination with an instruction execution system, apparatus, or device. The program code included in the computer-readable medium may be transmitted with any proper medium, including, but not limited to, radio, a wire, an optical cable, Radio Frequency (RF), etc., or any proper combination thereof.

The flowcharts and block diagrams in the drawings illustrate the architecture, functionality, and operation of systems, methods, and computer program products that can be realized according to various embodiments of the present disclosure. In this regard, each block in the flowchart or block diagram may represent a module, a program segment, or a portion of a code, which includes one or more executable instructions for implementing the specified logic function. It is also to be noted that in some alternative implementations, the functions marked in the blocks may also occur in a different order from those marked in the drawings. For example, two blocks shown in succession may, in fact, be executed substantially in parallel, and sometimes in a reverse order, depending upon the functionality involved. It is also to be noted that each block in the block diagram or flowchart, and a combination of blocks in the block diagram or flowchart, can be implemented by a special purpose hardware-based system which performs a specified function or operation, or a combination of special purpose hardware and computer instructions.

The units described in the embodiments of the present disclosure may be implemented by means of software or hardware. The units described may also be provided in a processor, for example, a processor may be described as including a determination unit, a registration unit, and a first monitoring unit. The names of the units do not constitute a limitation on the unit itself in some cases, for example, the receiving unit may also be described as "a unit configured to determine a first smart contract deployed on a blockchain".

As another aspect, the present disclosure also provides a computer-readable medium, which may be included in the apparatus described in the above embodiments, or may also be present separately and not fitted into the apparatus. The above computer-readable medium carries one or more programs. One or more above programs are executed by the apparatus to enable the apparatus to include that: a first smart contract deployed on a blockchain is determined, and the first smart contract includes an event trigger function; identification information of the first smart contract and an event corresponding to the event trigger function are registered to a bottom layer of the blockchain by means of a preset bottom layer interface; and a corresponding monitoring interface is generated for the event, and event information related to the event is obtained by means of the monitoring interface, so as to execute the first smart contract based on the event information related to the event.

As another aspect, the present disclosure also provides a computer-readable medium, which may be included in the apparatus described in the above embodiments, or may also be present separately and not fitted into the apparatus. The above computer-readable medium carries one or more programs. One or more above programs are executed by the apparatus to enable the apparatus to include that: for a first smart contract including an event trigger function, the following operations are executed: event information related to an event corresponding to the event trigger function is obtained by means of a monitoring interface; and when the event information satisfies the event trigger function, the first smart contract is executed.

According to the technical solutions of the embodiments of the present disclosure, the identification information of the first smart contract and the event corresponding to the event trigger function are registered to the bottom layer of the blockchain by means of the preset bottom layer interface, and the corresponding monitoring interface is generated for the event, that is, the smart contract is registered to the bottom layer of the blockchain, so that the event corresponding to the event trigger function included in the smart contract may be monitored by registration, so as to execute the first smart contract according to a monitored result (namely, the event information related to the event), thereby triggering the execution of the smart contract by means of a specific event.

According to the technical solutions of the embodiments of the present disclosure, the event information related to the event corresponding to the event trigger function is obtained by means of the monitoring interface, and whether the event information satisfies the event trigger function is judged, so as to determine whether to execute the first smart contract with the event trigger function, so that the first smart contract is triggered in the blockchain by means of combining the event information and the event trigger function, thereby effectively ensuring that the first smart contract with the event trigger function in the blockchain may be executed according to the event information related to the event.

The above specific implementation mode does not constitute a limitation to the scope of protection of the present disclosure. Those skilled in the art should understand that various modifications, combinations, subcombinations, and substitutions can occur, depending upon design requirements and other factors. Any modifications, equivalent substitutions, improvements, etc. within the spirit and scope of the present disclosure shall be included in the scope of protection of the present disclosure.

What is claimed is:

1. A method for registering a smart contract in a blockchain, comprising:

determining a first smart contract deployed on the blockchain, wherein the first smart contract comprises an event trigger function;

registering identification information of the first smart contract and an event corresponding to the event trigger function to a bottom layer of the blockchain by means of a preset bottom layer interface, wherein when the first smart contract comprises at least two event trigger functions, and each of the event trigger functions corresponds to one processing logic in the first smart contract, registering the identification information of the first smart contract, events corresponding to the at least two event trigger functions and identification information of processing logics corresponding to the events to the bottom layer of the blockchain by means of the preset bottom layer interface;

generating a corresponding monitoring interface for the event, and obtaining event information related to the event by means of the monitoring interface;

inputting an event feature included in the event information into the event trigger function;

determining whether the event feature satisfies the event trigger function, and if so, executing the first smart contract corresponding to the event trigger function or executing a processing logic in the first smart contract corresponding to the event trigger function;

providing a transaction block for a second smart contract without an event trigger function, wherein a transaction corresponding to the second smart contract is recorded in the transaction block; and when an execution trigger of the second smart contract is received, executing the transaction block corresponding to the second smart contract; and providing a built-in block or a built-in area located in a transaction block for the first smart contract, and configuring a corresponding amount of consumable resources for the built-in block or the built-in area, wherein a transaction of the first smart contract is recorded in the built-in block or the built-in area;

wherein executing the first smart contract comprises: when an execution trigger of the first smart contract is received, judging whether an amount of resources currently required is not greater than the amount of consumable resources corresponding to the built-in block or the built-in area, if so, executing the built-in block or the built-in area corresponding to the first smart contract, otherwise prohibiting the execution.

2. The method for registering the smart contract in the blockchain as claimed in claim 1, wherein, the first smart contract further comprises a contract information table, wherein the identification information of the smart contract and the event corresponding to the event trigger function are collated in the contract information table;

before registering the identification information of the first smart contract and the event corresponding to the event trigger function to the bottom layer of the blockchain, the method further comprises:

obtaining the identification information of the first smart contract and the event corresponding to the event trigger function in the contract information table by means of the bottom layer interface.

3. The method for registering the smart contract in the blockchain as claimed in claim 1, further comprising: maintaining a correspondence between a type of an event trigger function and an event;

before registering the identification information of the first smart contract and the event corresponding to the event trigger function to the bottom layer of the blockchain, the method further comprises:

obtaining the identification information of the first smart contract and the event trigger function from the first smart contract by means of the bottom layer interface; and determining the event corresponding to the event trigger function based on the correspondence.

4. The method for registering the smart contract in the blockchain as claimed in claim 1, further comprising:

monitoring an update condition of the first smart contract; and when the update condition indicates that the event trigger function is updated, updating the event corresponding to the event trigger function.

5. The method for registering the smart contract in the blockchain as claimed in claim 1, wherein the event comprises:

any one or more of a time trigger event, a block height trigger event, and a service record trigger event.

6. The method for registering the smart contract in the blockchain as claimed in claim 1, wherein executing the first smart contract comprises:

when the first smart contract comprises at least two event trigger functions, and each of the event trigger functions corresponds to one processing logic in the first smart contract, executing the processing logic corresponding to the event trigger function according to the event information.

7. An electronic device for registering a smart contract in a blockchain, comprising:

one or more processors; and a storage device, configured to store one or more programs, the one or more programs are executed by the one or more processors to enable the one or more processors to implement following actions:

determining a first smart contract deployed on the blockchain, wherein the first smart contract comprises an event trigger function;

registering identification information of the first smart contract and an event corresponding to the event trigger function to a bottom layer of the blockchain by means of a preset bottom layer interface, wherein when the first smart contract comprises at least two event trigger functions, and each of the event trigger functions corresponds to one processing logic in the first smart contract, registering the identification information of the first smart contract, events corresponding to the at least two event trigger functions and identification information of processing logics corresponding to the events to the bottom layer of the blockchain by means of the preset bottom layer interface;

generating a corresponding monitoring interface for the event, and obtaining event information related to the event by means of the monitoring interface;

inputting an event feature included in the event information into the event trigger function;

determining whether the event feature satisfies the event trigger function, and if so, executing the first smart contract corresponding to the event trigger function or executing a processing logic in the first smart contract corresponding to the event trigger function;

providing a transaction block for a second smart contract without an event trigger function, wherein a transaction corresponding to the second smart contract is recorded in the transaction block; and when an execution trigger of the second smart contract is received, executing the transaction block corresponding to the second smart contract; and providing a built-in block or a built-in area located in a transaction block for the first smart contract, and configuring a corresponding amount of consumable resources for the built-in block or the built-in area, wherein a transaction of the first smart contract is recorded in the built-in block or the built-in area;

wherein executing the first smart contract comprises:

when an execution trigger of the first smart contract is received, judging whether an amount of resources currently required is not greater than the amount of consumable resources corresponding to the built-in block or the built-in area, if so, executing the built-in block or the built-in area corresponding to the first smart contract, otherwise prohibiting the execution.

8. The electronic device for registering the smart contract in the blockchain as claimed in claim 7, wherein, the first smart contract further comprises a contract information table, wherein the identification information of the smart contract and the event corresponding to the event trigger function are collated in the contract information table;

before registering the identification information of the first smart contract and the event corresponding to the event trigger function to the bottom layer of the blockchain, the method further comprises:

obtaining the identification information of the first smart contract and the event corresponding to the event trigger function in the contract information table by means of the bottom layer interface.

9. The electronic device for registering the smart contract in the blockchain as claimed in claim 7, further comprising: maintaining a correspondence between a type of an event trigger function and an event;

before registering the identification information of the first smart contract and the event corresponding to the event trigger function to the bottom layer of the blockchain, the method further comprises:

obtaining the identification information of the first smart contract and the event trigger function from the first smart contract by means of the bottom layer interface; and determining the event corresponding to the event trigger function based on the correspondence.

10. A non-transitory computer-readable storage medium, on which a computer program is stored, wherein the program is executed by a processor to implement following actions:

determining a first smart contract deployed on the blockchain, wherein the first smart contract comprises an event trigger function;

registering identification information of the first smart contract and an event corresponding to the event trigger function to a bottom layer of the blockchain by means of a preset bottom layer interface, wherein when the first smart contract comprises at least two event trigger functions, and each of the event trigger functions corresponds to one processing logic in the first smart contract, registering the identification information of the first smart contract, events corresponding to the at least two event trigger functions and identification information of processing logics corresponding to the events to the bottom layer of the blockchain by means of the preset bottom layer interface;

generating a corresponding monitoring interface for the event, and obtaining event information related to the event by means of the monitoring interface;

inputting an event feature included in the event information into the event trigger function;

determining whether the event feature satisfies the event trigger function, and if so, executing the first smart contract corresponding to the event trigger function or executing a processing logic in the first smart contract corresponding to the event trigger function;

providing a transaction block for a second smart contract without an event trigger function, wherein a transaction corresponding to the second smart contract is recorded in the transaction block; and when an execution trigger of the second smart contract is received, executing the transaction block corresponding to the second smart contract; and providing a built-in block or a built-in area located in a transaction block for the first smart contract, and configuring a corresponding amount of consumable resources for the built-in block or the built-in area, wherein a transaction of the first smart contract is recorded in the built-in block or the built-in area;

wherein executing the first smart contract comprises:

when an execution trigger of the first smart contract is received, judging whether an amount of resources currently required is not greater than the amount of consumable resources corresponding to the built-in block or the built-in area, if so, executing the built-in block or the built-in area corresponding to the first smart contract, otherwise prohibiting the execution.

11. The non-transitory computer-readable storage medium as claimed in claim 10, wherein, the first smart contract further comprises a contract information table, wherein the identification information of the smart contract and the event corresponding to the event trigger function are collated in the contract information table;

before registering the identification information of the first smart contract and the event corresponding to the event trigger function to the bottom layer of the blockchain, the method further comprises:

obtaining the identification information of the first smart contract and the event corresponding to the event trigger function in the contract information table by means of the bottom layer interface.

12. The non-transitory computer-readable storage medium as claimed in claim 10, wherein, further comprising: maintaining a correspondence between a type of an event trigger function and an event;

before registering the identification information of the first smart contract and the event corresponding to the event trigger function to the bottom layer of the blockchain, the method further comprises:

obtaining the identification information of the first smart contract and the event trigger function from the first smart contract by means of the bottom layer interface; and determining the event corresponding to the event trigger function based on the correspondence.

* * * * *